United States Patent [19]
McNaughton et al.

[11] Patent Number: 5,275,448
[45] Date of Patent: Jan. 4, 1994

[54] QUICK CONNECT TUBING CONNECTOR AND METHOD OF ASSEMBLY

[75] Inventors: James McNaughton, Rochester; Mark G. Ketcham, Marine City; Walfred J. Liimatta, Rochester Hills, all of Mich.

[73] Assignee: Huron Products Industries, Inc., Mt. Clemens, Mich.

[21] Appl. No.: 840,376

[22] Filed: Feb. 24, 1992

Related U.S. Application Data

[63] Continuation-in-part of Ser. No. 757,393, Sep. 10, 1991.

[51] Int. Cl.⁵ .................. F16L 37/12; F16L 33/70
[52] U.S. Cl. ........................... 285/319; 285/256; 285/321; 285/348; 285/305
[58] Field of Search ............ 285/256, 319, 321, 253, 285/348, 276, 305

[56] References Cited

U.S. PATENT DOCUMENTS

| | | |
|---|---|---|
| 1,785,638 | 12/1930 | Ludwig . |
| 1,903,445 | 4/1933 | Ernst . |
| 2,288,684 | 7/1942 | Couty . |
| 2,374,225 | 4/1945 | Melsom . |
| 2,386,562 | 10/1945 | Mahoney . |
| 2,570,477 | 10/1951 | Paquin . |
| 2,686,066 | 8/1954 | Paquin . |
| 3,394,950 | 7/1968 | Jensen . |
| 3,549,180 | 12/1970 | MacWilliam ............... 258/256 |
| 3,847,421 | 11/1974 | Eschbaugh et al. ......... 285/379 |
| 3,873,062 | 3/1975 | Johnson et al. . |
| 4,018,460 | 4/1977 | Morris et al. . |
| 4,664,424 | 5/1987 | Smith ......................... 285/256 |
| 4,681,351 | 7/1987 | Bartholomew ............. 285/319 |
| 4,733,890 | 3/1988 | Vyse ........................... 285/256 |
| 4,750,765 | 6/1988 | Cassidy et al. ............. 285/321 |
| 4,778,203 | 10/1988 | Bartholomew ............. 285/319 |
| 4,804,212 | 2/1989 | Vyse ........................... 285/256 |
| 4,817,997 | 4/1989 | Ingram ....................... 285/256 |
| 4,991,876 | 2/1991 | Mulvey . |

Primary Examiner—Eric K. Nicholson
Attorney, Agent, or Firm—Kinzer, Plyer, Dorn, McEachran & Jambor

[57] ABSTRACT

A unique fluid connector is disclosed that quickly connects a tube within a housing bore, while providing a strong, fluid tight seal. The tube has axially spaced radially greater diameter upset portions with a sleeve and a locking member trapped between the upset portions. The locking member includes resilient arms which secure it within the housing bore. The sleeve has a notch at an inner axial end which abuts the inner upset portion to retain the tube within the bore. An O-ring is positioned axially inwardly of the upset portion. The sleeve and the inner upset portion both abut the O-ring to provide a fluid tight seal between the tube and the housing. In a unique method, a tube unit is assembled by forming the outer upset portion on the tube. The locking member and sleeve are then moved onto the tube. The inner upset portion is then formed on the tube to secure the locking member and the sleeve on the tube. An O-ring retaining portion is then formed on the tube, and the O-ring is positioned onto the tube. The assembled tube unit is then inserted into the housing bore. Further, a flexible tube may be connected to an outer end of said tube by crimping a metal ferrule radially inwardly.

8 Claims, 3 Drawing Sheets

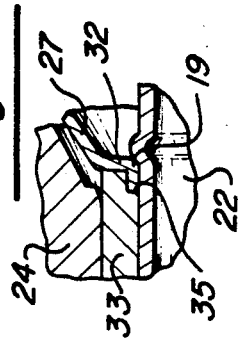
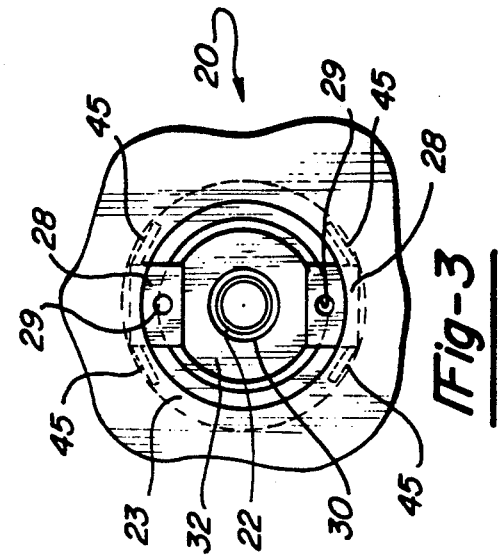
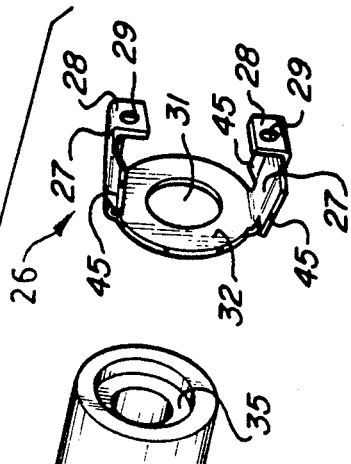
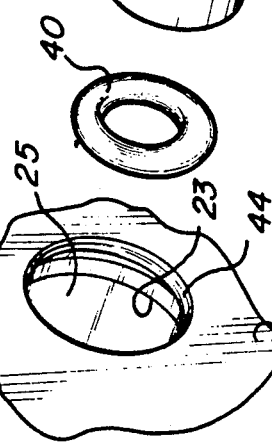

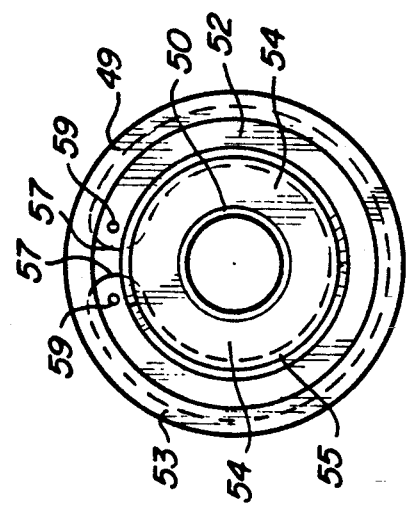
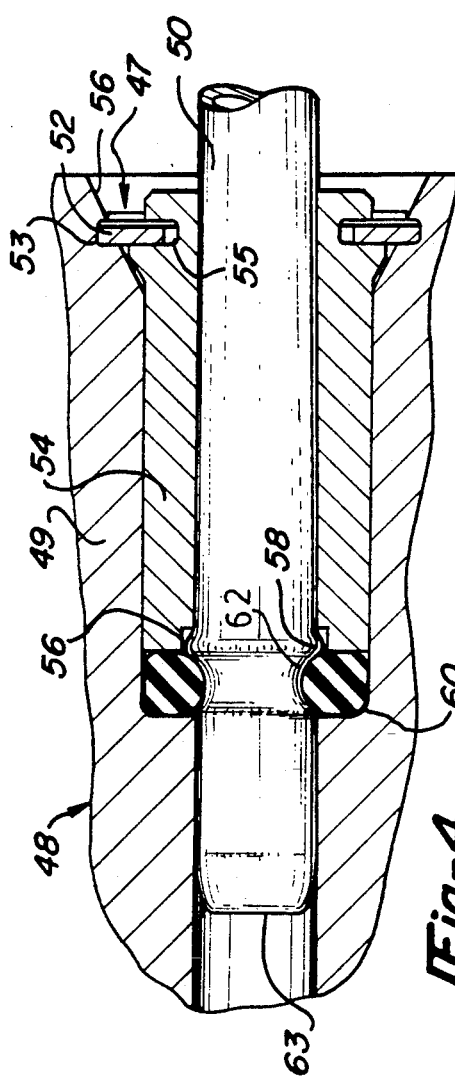
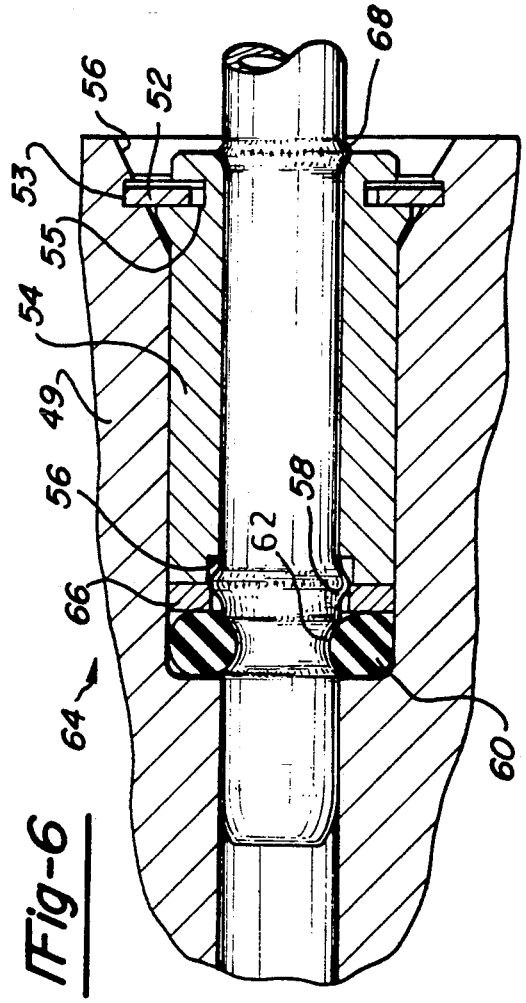

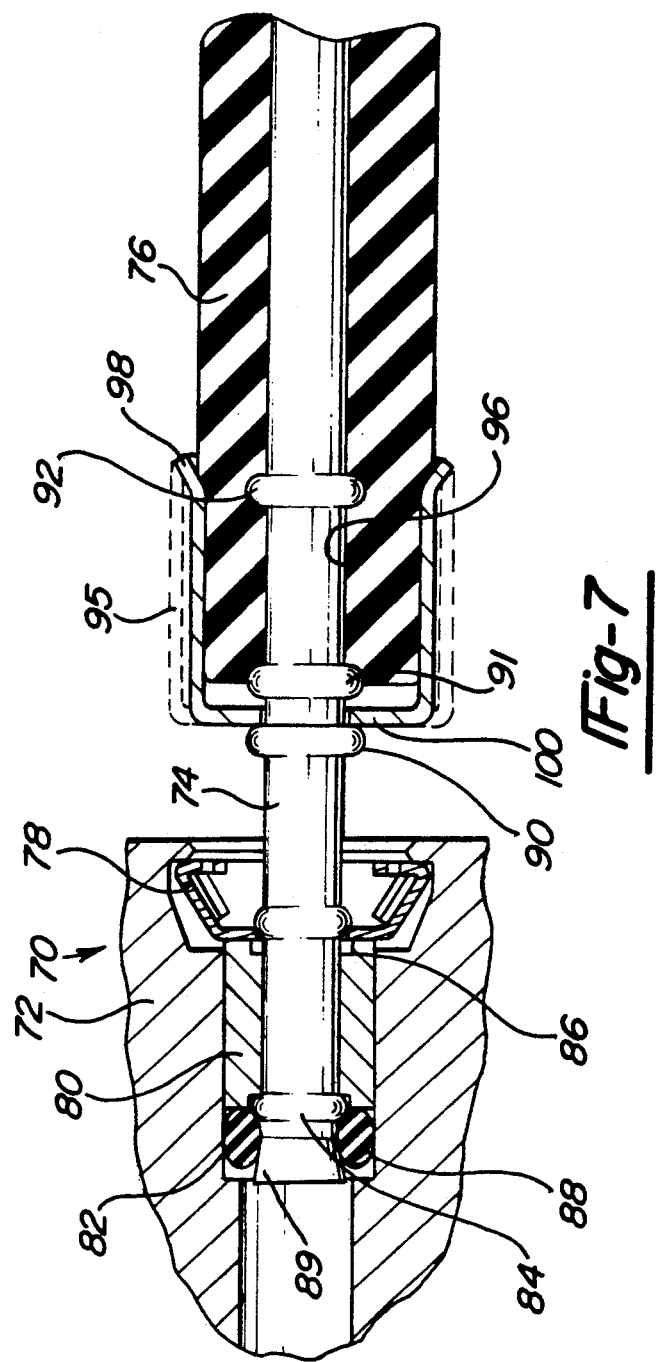

QUICK CONNECT TUBING CONNECTOR AND METHOD OF ASSEMBLY

BACKGROUND OF THE INVENTION

This application is a continuation-in-part of U.S. patent application Ser. No. 07/757,393 filed Sep. 10, 1991.

This invention relates to a quick connect coupling that provides a strong, fluid tight seal. In addition, a method of assembling such a quick connect coupling is disclosed.

Various quick connect couplings are known to secure high pressure fluid lines of the sort typically found in power steering, air conditioning, brake or other systems within a housing. In such high pressure systems, the quick connect coupling must quickly and securely connect tubing within the housing, and must also provide a strong fluid tight seal. Prior art quick connect couplings have some deficiencies in achieving the goals of being quickly connected, providing a strong connection between the tube and the housing, and also providing a fluid tight seal.

One type of coupling disclosed in the prior art includes a bushing secured within the housing and abutting the tube upset portion, retaining the tube in the housing. These prior art structures have provided relatively quick connections, however, they have generally been complex and have not always provided fluid tight seals.

In addition, the means to secure the bushings in these prior art structures have been somewhat deficient. They have not always provided both quick and strong connections between the bushing and the housing.

Finally, prior art quick connect couplings are known in which the tube, a member for securing the tube within a housing, and seals are all inserted into a housing as a one-piece unit. The prior art methods of assembling these one-piece units have been somewhat deficient in the prior art, and overly complex.

SUMMARY OF THE INVENTION

The present invention discloses a unique quick connect tubing connector which provides a strong connection between a tube and a housing, and also provides a fluid tight seal. Further, a method of assembling this quick connect tubing connector is disclosed which is less complex than prior art methods of assembly.

In one disclosed embodiment, a tube is received within a bore in a housing. A locking member secures a sleeve within the bore. A notch at an axial end of the sleeve positioned into the bore abuts a first radially greater, or upset portion, of the tube, retaining the tube within the bore. In a preferred embodiment of the present invention, an outer portion of the notch abuts a seal radially outwardly of the upset portion to provide a fluid tight connection between the housing and tube.

In another aspect of the present invention, the locking member has plural circumferentially-spaced resilient arms which have a radially outer relaxed dimension greater than the inner radial dimension of an entrance portion to the bore. When fully connected, the locking member is received within a portion of the bore which has a greater radial dimension than the relaxed dimension. The arms are biased inwardly while entering the bore and moving through the entrance portion. When the arms move axially into the greater radial dimension portion of the bore, they spring outwardly back to their relaxed dimension. In this position the arms retain the locking member, and consequently the sleeve and tube, within the bore.

Most preferably, the resilient arms have circumferentially-spaced braces at each circumferential end. The braces extend slightly radially inwardly and circumferentially from the arms. Preferably, the arms each have a tang extending radially inwardly from an outer end. The tangs preferably have holes to facilitate removal of the locking member. An inner end of each arm is connected to a ring-shaped member. The ring-shaped member abuts the sleeve, and secures it in the bore.

In another preferred feature, the tube has a second upset portion formed axially outwardly of the locking member and sleeve. The locking member and sleeve are thus trapped and received between the first and second upset portions of the tube. A seal is received between the first upset portion and an inner end of the tube. The sleeve abuts this seal. The assembled tube, sleeve, locking member, and seal may then all be inserted into the bore as a unit.

In another aspect of the present invention, a method of assembling the quick connect tubing connector is disclosed in which the second upset portion is formed on the tube at a position spaced axially from one end. The locking member and sleeve are positioned on the one end of the tube, and moved to a position where they abut this first upset portion. A first upset portion is then formed axially between the end of the sleeve and the one end of the tube, trapping the sleeve and locking member between the first and second upset portions. A seal securing portion is then formed between the first upset portion and the one end, and a seal is secured by the seal securing portion. The assembled tube connector is then inserted into the bore, where it is quickly connected to provide a strong, fluid tight seal between the tube and the housing.

In a further feature of the present invention, a flexible hose is attached to an outer end of the tube and crimped onto the tube by crimping a ferrule radially inwardly onto the flexible hose. The crimped ferrule squeezes the hose onto the tube between a pair of spaced upset portions on an outer end of the tube.

These and other features of the present invention can be best understood from the following specification and drawings, of which the following is a brief description.

BRIEF DESCRIPTION OF THE DRAWINGS

FIG. 1A is a cross-sectional view through a first embodiment of the present invention.

FIG. 1B is a view similar to FIG. 1A, but showing a slight modification.

FIG. 2 is a partial exploded view of portions of the connector of the present invention.

FIG. 3 is an end view of the device illustrated in FIG. 1.

FIG. 4 is a cross-sectional view similar to FIG. 1, but through a second embodiment of the present invention.

FIG. 5 is an end view the connector illustrated in FIG. 4.

FIG. 6 is a cross-sectional view similar to FIG. 3, but showing a third embodiment of the present invention.

FIG. 7 is a cross-sectional view showing a further feature of the present invention.

DETAILED DESCRIPTION OF A PREFERRED EMBODIMENT

FIG. 1A shows fluid connector 20 for connecting a tube 22 within a bore 25 in housing 24. Tube 22 is preferably connected to a source of high pressure fluid, such as a hydraulic brake, a conditioning, or power steering line. A retainer or locking member 26 has a pair of resilient arms 27, which include tangs 28 extending radially inwardly from an outer end of arms 27 adjacent an outer end of bore 25. Arms 27 are shown in a relaxed position where tangs 28 abut a face 23 of bore 25, preventing removal of locking member 26 from bore 25. Tangs 28 have holes 29 into which a tool may be inserted to bias arms 27 radially inwardly for insertion or removal of locking member 26.

Tube 22 has an axially outer radially enlarged, or upset, portion 30 adjacent an axially outer end of bore 25. A bore 31 is formed in a ring-shaped member 32, and is received on tube 22 such that upset portion 30 abuts an axially outer face of ring-shaped member 32. A steel spacer, bushing or sleeve 33 is positioned on an inner face of ring-shaped member 32. Sleeve 33 and locking member 26 are trapped on tube 22 between upset portion 30 and an axially inner upset portion 34. Sleeve 33 has a notch 35 formed adjacent inner upset portion 34, and consisting of a radially inner portion 36 which abuts upset portion 34 and a radially outer portion 38 which is axially aligned with, and radially outwardly of, inner upset portion 34.

An O-ring seal 40 is positioned axially between portion 38 of sleeve 33 and an inner face 41 of bore 25. Both sleeve portion 38 and tube inner upset portion 34 abut seal 40 and force seal 40 into sealing engagement with face 41, providing a fluid tight seal. An expanded end 42 of tube 22 secures seal 40 on tube 22.

Tube 22 is preferably inserted into bore 25 with locking member 26, sleeve 33, and O-ring 40 all received as an assembled unit. The assembled unit passes easily into bore 25 until resilient arms 27 of locking member 26 encounter conical entrance portion 44. Arms 27 are then biased radially inwardly, either with the assistance of a tool in holes 29, or by the conically inwardly extending face of conical entrance portion 44. Locking member 26 thus moves axially past entrance portion 44.

Once past entrance portion 44, locking arms 27 spring radially outwardly to their relaxed position, such that tangs 28 abut face 23 of bore 25. In this way locking member 26 is secured within bore 25. Ring-shaped member 32 abuts an outer end of sleeve 33. Portion 36 is forced against upset end 34, securing tube 22 within bore 25.

As shown in FIG. 1B, a cylindrical lip 19 may extend axially inwardly from ring-shaped member 32, and be received in notch 35.

Details of locking member 26, sleeve 33 and O-ring 40 can be best understood from FIG. 2. Bore 25 is formed within housing 24 and has conical entrance portion 44 and face 23. O-ring 40 is spaced axially inwardly from sleeve 33. Sleeve 33 preferably has notch 35 at each axial end, such that sleeve 33 may be used in either axial direction. Locking member 26 has arms 27 extending axially and radially outwardly from ring-shaped member 32. Tangs 28 extend radially inwardly from an outer end of arms 27 and have holes 29. Ring-shaped member 32 has bore 31.

Braces 45 extend circumferentially and slightly radially inwardly from circumferential ends of each arm 27. Braces 45 add strength to arms 27 and resist buckling should a force be applied to attempt to remove tube 22 from bore 25.

FIG. 3 is an end view of coupling 20 as illustrated in FIG. 1. Tube 22 is received within a center of bore 25. Upset end 30 abuts an outer face of ring-shaped member 32. Tangs 28 extend radially inwardly and abut wall 43. Braces 45 extend circumferentially and radially inwardly from tangs 28.

FIG. 4 shows a second embodiment connector 48. Tube 50 is secured within a bore 47 in housing 49 by a lock ring 52 received within a notch 53. Lock ring 52 is also received within a notch 55 on sleeve 54. Conical entrance portion 56 extends to the outer end of bore 47.

The assembled tube unit is inserted, and ring 52 snaps into notch 53 locking sleeve 54 within housing 49. Sleeve 54 has a notch 56 positioned adjacent upset portion 58. In this regard it secures tube 50 within housing 49 similar to the first embodiment. O-ring 60 is secured by a ditch 62 formed at an axial position between upset portion 58 and an end 63 of tube 50.

FIG. 5 shows details of lock ring 52 for use with second embodiment 48. Lock ring 52 includes a pair of spaced ends 57. Holes 59 are formed adjacent ends 57, and may receive a tool such that ends 57 can be biased towards each other to facilitate insertion or removal of lock ring 52 through the conical entrance portion 56. The combination of biasing ends 57 circumferentially together, and the conically inwardly tapered surface of conical entrance portion 56, assist in the insertion of lock ring 52 into notch 53.

FIG. 6 shows a third embodiment connector 64. Third embodiment 64 is similar to second embodiment 48 except that a spacer seal 66 is positioned axially adjacent upset portion 58. The end of sleeve 56 which forms notch 56 abuts spacer 66 to provide a fluid tight seal. O-ring 60 is received within ditch 62. A second upset portion 68 is formed at an outer axial end of tube 50 to secure sleeve 54 and lock ring 52 on tube 50.

FIG. 7 shows a further connector embodiment 70 having a housing 72 receiving a tube 74. A flexible hose 76 is connected to tube 74. A locking member 78, similar to those described above, is positioned inside housing 72, and acts in conjunction with sleeve 80 to secure tube 74 within housing 72. An O-ring 82 is positioned axially beyond an inner upset portion 84 to seal the fluid connection between tube 74 and housing 72. An outer upset portion 86 retains locking member 78 within housing 72. Tube 74 has a flared inner end 89 to secure seal 82 on the assembled tube 74. Thus, the tube 74, locking member 78, sleeve 80 and O-ring 82 may all be assembled into housing 72 as a one-piece unit.

An axially outer portion of tube 74 has three spaced hose upset portions 90, 91 and 92. A ferrule 94 which is originally cylindrical as shown in phantom at 95, is crimped radially inwardly to squeeze flexible hose 76 into area 96 between upset portions 91 and 92. When ferrule 94 is crimped, an outer end 98 may flare slightly outwardly. An axially inner end 100 of ferrule 94 extends radially towards tube 74 between upset portions 91 and 90.

A method of forming the various fluid connections will now be disclosed with reference to the drawings. The tube is initially of a generally uniform outer diameter. An upset portion 30 or 68 is formed at a position spaced from a first end of the tube. In the second embodiment, shown in FIG. 4, this step is eliminated. The sleeve and locking member, or lock ring, are then moved onto the tube from the one end towards the upset portion. The inner upset portion 34 or 58 is then formed to secure the sleeve and locking member on the tube. A seal securing member 42 or 62 is then formed between the inner upset portion and an inner end of the tube. The seal is then placed on the seal securing member. The assembled unit is then inserted into the bore in the housing.

In forming embodiment 70, as shown in FIG. 7, the inner portions of the tube are formed in a similar fashion to those discussed above. Preferably, either the entire inside portion of the tube is formed and then the outer portions, shown to the right of upset portion 90 in FIG. 7, are formed subsequently to complete the tube unit. Alternatively, the portions outside of the housing may be formed first and then the inner portions formed subsequently.

In forming the outer portions, upset portion 90 is preferably initially formed on tube 74. Ferrule 94 is then placed on the tube from the outer end. Upset portions 91 and 92 are then preferably formed. Hose 76 is then forced onto upset portions 91 and 92, and ferrule 94 is crimped inwardly from position 95. Hose 76 is thus securely fastened to tube 74.

In a preferred embodiment, the ditch 42 is a rolled groove. The upset portions are formed by a standard upset machine. The flared end is also formed by standard machining methods.

Most preferably locking member 26 is formed of a stainless steel. Further, the sleeve is preferably formed from 12L14 steel. The O-ring is preferably of the type commonly known as E.P.D.M.

Preferred embodiments of the present invention have been disclosed, however, a worker of ordinary skill in the art would recognize that certain modifications would come within the scope of this invention. Thus, the following claims should be studied in order to determine the true scope and content of this invention.

We claim:

1. A fluid connector comprising:
   a housing defining a bore, said bore extending axially inwardly into said housing, said bore having an entrance portion of a relatively small first radial dimension at an outer end of said bore, and a greater radial portion of a second dimension positioned axially inwardly from said entrance portion; and
   a tube having a first end received in said bore and a second end extending outwardly of said bore; a flexible hose connected to said second end of said tube, a ferrule being crimped radially inwardly of said hose to hold said hose on said tube, said tube being secured within said bore by a locking member, said locking member having resilient arms extending away from a ring-shaped member, said arms having a relaxed outer radial dimension intermediate said first and second dimensions and being biased inwardly as said locking member is moved into said bore and through said entrance portion, said arms springing radially outwardly to said relaxed dimension, securing said locking member within said bore when said locking member reaches said greater radial portion, said ring-shaped member abutting an outer axial extent of a sleeve, and an inner axial extent of said sleeve abutting a radially greater portion of said tube, such that said ring-shaped member of said locking member retains said sleeve within said bore, and said sleeve retains said tube within said bore.

2. A fluid connector as recited in claim 1, wherein said second end of said tube includes at least two spaced outer upset portions, said two spaced outer upset portions having a radially greater dimension than a portion of said tube intermediate said two spaced outer upset portions, and said ferrule being deformed radially inwardly at said portion to hold said flexible hose on said tube.

3. A fluid connector as recited in claim 2, wherein a third outer upset portion is formed axially inwardly of said two spaced outer upset portions, and said ferrule includes an inner portion positioned between said third outer upset portion and an innermost of said two spaced outer upset portions.

4. A fluid connector as recited in claim 3, wherein said inner portion extends radially inwardly from a main body of said ferrule, said axially inner portion of said ferrule having an inner peripheral surface with an inner diameter that is greater than the nominal outer diameter of said tube, but which is less than the outer diameter of said upset portions of said tube such that said ferrule cannot move axially beyond upset portions.

5. A fluid connector as recited in claim 2, wherein said ferrule has an axially inward portion which extends radially inwardly from a main body of said ferrule, said axially inner portion of said ferrule having an inner peripheral surface with an inner diameter that is greater than the nominal outer diameter of said tube, but which is less than the outer diameter of said upset portions of said tube such that said ferrule cannot move axially beyond said upset portions.

6. A fluid connector as recited in claim 1, further comprising a seal positioned on said tube axially inwardly of said radially greater portion of said tube, said seal being compressed in a radial direction only.

7. A method of assembling a tube unit for insertion within a housing, comprising the steps of:
   (1) forming an outer radially greater portion on a tube at an axial location spaced from a first axial end of said tube;
   (2) placing a locking member on said tube between said outer radially greater portion and said first end;
   (3) placing a sleeve on said tube between said locking member and said first end, such that said locking member is secured on said tube between said outer radially greater portion and an outer axial extent of said sleeve;
   (4) forming an inner radially greater portion between said sleeve and said first end to secure said sleeve on said tube;
   (5) forming a seal retaining portion in said tube between said inner radially greater portion and said first end of said tube;
   (6) placing a seal on said seal retaining portion; and
   (7) positioning a flexible hose at an axially outer end of said tube, and crimping a metal ferrule radially inwardly to
   secure said flexible tube on said outer end of said tube.

8. The method as recited in claim 7, wherein said tube has two outer radially greater portions spaced outwardly from said radially greater portion formed in step (1), and said ferrule is deformed radially inwardly at a location spaced between said two outer upset portions.

* * * * *